(12) United States Patent
Choi

(10) Patent No.: US 12,090,877 B2
(45) Date of Patent: Sep. 17, 2024

(54) ELECTRIC VEHICLE CHARGING CONNECTOR AND ELECTRIC VEHICLE CHARGING ASSEMBLY COMPRISING SAME

(71) Applicant: LS EV KOREA LTD., Gunpo-si (KR)

(72) Inventor: Uk Yeol Choi, Seoul (KR)

(73) Assignee: LS EV KOREA LTD., Gunpo-si (KR)

( * ) Notice: Subject to any disclaimer, the term of this patent is extended or adjusted under 35 U.S.C. 154(b) by 297 days.

(21) Appl. No.: 17/756,489

(22) PCT Filed: Nov. 19, 2020

(86) PCT No.: PCT/KR2020/016367
§ 371 (c)(1),
(2) Date: May 26, 2022

(87) PCT Pub. No.: WO2021/107503
PCT Pub. Date: Jun. 3, 2021

(65) Prior Publication Data
US 2022/0410743 A1 Dec. 29, 2022

(30) Foreign Application Priority Data
Nov. 27, 2019 (KR) .................. 10-2019-0154578

(51) Int. Cl.
*H01B 7/42* (2006.01)
*B60L 53/16* (2019.01)
(Continued)

(52) U.S. Cl.
CPC ............. *B60L 53/302* (2019.02); *B60L 53/16* (2019.02); *B60L 53/18* (2019.02); *H01B 7/423* (2013.01);
(Continued)

(58) Field of Classification Search
CPC ........ B60L 53/302; B60L 53/16; B60L 53/18; H01B 7/423
See application file for complete search history.

(56) References Cited

U.S. PATENT DOCUMENTS 6,249,218 B1 * 6/2001 Blair ...................... G01S 7/021
340/447
7,156,677 B2 * 1/2007 Yamane ............. H01H 85/2045
439/949
(Continued)

FOREIGN PATENT DOCUMENTS

CN 108701513 A 10/2018
DE 102016206300 A1 10/2017
(Continued)

OTHER PUBLICATIONS

Extended European Search Report for related European Application No. 20893833.2; action dated Nov. 23, 2023; (9 pages).
(Continued)

*Primary Examiner* — Neil Abrams
(74) *Attorney, Agent, or Firm* — K&L Gates LLP

(57) ABSTRACT

The present disclosure relates to an electric vehicle charging connector, in which a heat sink is provided to effectively cool the electric vehicle charging connector during charging of an electric vehicle, heat generated in an interface between an electric vehicle cable and a conductor of a connector connection unit is quickly absorbed by the heat sink, and a cooling fluid flows in the heat sink to cool an electric vehicle charging cable and is collected in an electric vehicle charger after cooling of the heat sink, and an electric vehicle charging assembly.

17 Claims, 8 Drawing Sheets

(51) Int. Cl.
*B60L 53/18* (2019.01)
*B60L 53/302* (2019.01)
*H01R 13/66* (2006.01)

(52) U.S. Cl.
CPC ..... *H01R 13/6683* (2013.01); *H01R 2201/26* (2013.01)

(56) References Cited

U.S. PATENT DOCUMENTS

| | | | |
|---|---|---|---|
| 8,257,101 B2* | 9/2012 | Ichio | H01R 13/4367 439/559 |
| 10,644,422 B2* | 5/2020 | Moseke | B60L 53/302 |
| 10,644,442 B2* | 5/2020 | Moseke | B60L 53/30 |
| 10,902,977 B2* | 1/2021 | Cantz | H01R 13/506 |
| 10,985,507 B2* | 4/2021 | Rose | H01R 13/6683 |
| 11,529,881 B2* | 12/2022 | Moseke | H01R 13/6683 |
| 11,845,348 B2* | 12/2023 | Moseke | B60L 50/60 |
| 2016/0200206 A1 | 7/2016 | Woo et al. | |
| 2017/0054248 A1* | 2/2017 | Moseke | H01R 13/504 |
| 2019/0036254 A1 | 1/2019 | Moseke | |
| 2019/0074620 A1* | 3/2019 | Moseke | B60L 53/16 |
| 2022/0410744 A1* | 12/2022 | Choi | B60L 53/18 |
| 2023/0052681 A1* | 2/2023 | Hemrle | B60L 53/16 |
| 2023/0182593 A1* | 6/2023 | Garcia-Ferre | B60L 53/18 439/296 |

FOREIGN PATENT DOCUMENTS

| | | |
|---|---|---|
| JP | 2017507640 A | 3/2017 |
| JP | 2018125118 A | 8/2018 |
| JP | 2018129161 A | 8/2018 |
| JP | 2019511095 A | 4/2019 |
| JP | 3223818 U | 11/2019 |
| KR | 1020190022850 A | 3/2019 |
| KR | 102028369 B1 | 10/2019 |
| WO | 2018155895 A1 | 8/2018 |

OTHER PUBLICATIONS

Office Action for related Japanese Application No. 2022-528323; action dated Apr. 25, 2023; (5 pages).
International Search Report for related International Application No. PCT/KR2020/016367; report dated Jun. 3, 2021; (9 pages).
Written Opinion for related International Application No. PCT/KR2020/016367; report dated Jun. 3, 2021; (5 pages).

* cited by examiner

ELECTRIC VEHICLE CHARGING CONNECTOR AND ELECTRIC VEHICLE CHARGING ASSEMBLY COMPRISING SAME

CROSS-REFERENCE TO RELATED APPLICATIONS

This application is the National Stage filing under 35 U.S.C. 371 of International Application No. PCT/KR2020/016367, filed on Nov. 19, 2020, which claims the benefit of earlier filing date of and right of priority to Korean Application No. 10-2019-0154578 filed on Nov. 27, 2019, the contents of which are all hereby incorporated by reference herein in their entirety.

FIELD

The present disclosure relates to an electric vehicle charging connector and an electric vehicle charging assembly including the same. Specifically, the present disclosure relates to an electric vehicle charging connector, in which a heat sink is provided to effectively cool the electric vehicle charging connector during charging of an electric vehicle, heat generated in an interface between an electric vehicle cable and a conductor of a connector connection unit is quickly absorbed by the heat sink, and a cooling fluid flows in the heat sink to cool an electric vehicle charging cable and is collected in an electric vehicle charger after cooling of the heat sink, and an electric vehicle charging assembly.

BACKGROUND

With the spread of electric vehicles, electric vehicle chargers have been widely installed. In addition, quick electric vehicle chargers have come into wide use for quick charging in a short time. Unlike slow charging, an output voltage of a quick electric vehicle charger for quick charging is in a range of DC 50V to 450V, a charging current exceeds 100 A, and a time required to charge an electric vehicle through the quick electric vehicle charger to a certain level, e.g., about 80% of a full charge amount, is only thirty to forty minutes. It is expected that a charging current of quick electric vehicle chargers will continuously increase with an increase of battery capacities of electric vehicles and the advancement of charging technology.

Power is supplied to an electric vehicle from a quick electric vehicle charger by connecting an electric vehicle charging cable to a main body of the quick electric vehicle charger, mounting a charging connector into an end of the electric vehicle charging cable, and mounting a connector of the quick electric vehicle charger into an electric vehicle connector unit of the electric vehicle.

Because a charging current of the quick electric vehicle charger is 100 A or more, heating of the electric vehicle charging cable used to transmit the charging current to the electric vehicle and a charging connector connected to the end of the cable may be a problem.

First, to minimize heat generated in the electric vehicle charging cable, a diameter of a conductor of the electric vehicle charging cable may be increased but generation of heat is difficult to be sufficiently reduced and the weight of the electric vehicle charging cable increases.

Heating of the electric vehicle charging cable is not desirable, because the electric vehicle charging cable may come into contact with a human body when the charging connector is mounted in the connector connection unit or is separated from the connector connection unit and placed in a charger and a user may be injured or feel discomfort or uneasiness.

A method of circulating a cooling fluid in an electric vehicle charging cable to cool heat generated in the electric vehicle charging cable has been introduced. In this method, a conductor of the electric vehicle charging cable is cooled using a cooling fluid.

During charging of an electric vehicle, high heat is generated due to an increase of resistance at an interface between the conductor of the electric vehicle charging cable and a power terminal of the electric vehicle charging connector electrically connected thereto, as in the electric vehicle charging cable, but there is a need to efficiently cool the electric vehicle charging connector using a simplified structure.

SUMMARY

The present disclosure is directed to providing an electric vehicle charging connector, in which a heat sink is provided to effectively cool the electric vehicle charging connector during charging of an electric vehicle, heat generated in an interface between an electric vehicle cable and a conductor of a connector connection unit is quickly absorbed by the heat sink, and a cooling fluid flows in the heat sink to cool an electric vehicle charging cable and is collected in an electric vehicle charger after cooling of the heat sink, and an electric vehicle charging assembly.

To achieve these objects, the present disclosure provides an electric vehicle charging assembly comprising: an electric vehicle charging cable comprising: a grounding unit; at least one communication unit; a pair of power units each including a conductor and an insulating layer covering the conductor; a cooling unit configured to cool the conductor and included in the conductor of each of the power units, the cooling unit including a cooling tube and a cooling channel which is provided in the cooling tube and in which a cooling fluid flows; and a collection unit including a collection tube in which a return channel is provided to collect the cooling fluid supplied through the cooling unit; and an electric vehicle charging connector comprising: a pair of power terminals each including a connecting part to be connected to a connector connection unit included in an electric vehicle and a conductor connection part into which the conductor of the electric vehicle charging cable is inserted to be connected to the connector connection unit; and a heat sink configured to absorb heat generated in the conductor connection part of each of the power terminals, and including therein a return channel for collecting the cooling fluid flowing through the cooling unit and supplying the cooling fluid to the collection unit.

And the heat sink may comprise a heat absorbing part configured to absorb heat in the conductor connection part of each of the power terminals by a heat conduction method.

And the heat absorbing part may have a shape corresponding to a shape of an outer circumferential surface of the conductor connection part of each of the power terminals.

And the electric vehicle charging assembly may further comprise a thermal pad between the outer circumferential surface of the conductor connection part and the heat absorbing part of the heat sink, the thermal pad being formed of a flexible material.

And one collection unit may be provided to collect the cooling fluid supplied through a pair of cooling units.

And the electric vehicle charging connector may further comprise a pair of connection pipes configured to connect the cooling channel in the cooling unit of the electric vehicle charging cable and the return channel of the heat sink.

And the collection unit may be connected to the heat sink to be connected to the return channel of the heat sink.

And the heat sink may be provided in a V shape to separate positions of the grounding unit and the pair of power units from each other.

And the pair of connection pipes may be connected to opposite upper ends of the heat sink, and the collection unit may be connected to a lower end of the heat sink.

And the conductor of the electric vehicle charging cable connected to the power terminal may have a self-twist and helically wound structure in which multiple self-twisted conductors formed by twisting multiple strands in a twist pitch are helically wound in a certain winding pitch.

And the electric vehicle charging assembly may further comprise a temperature sensor configured to measure temperature near the pair of power terminals.

And the electric vehicle charging connector may further comprise an interlock terminal.

And to achieve these objects, the present disclosure provides an electric vehicle charging connector, which supplies power to charge an electric vehicle when detachably mounted into a connector connection unit of the electric vehicle while being mounted into an electric vehicle charging cable, the electric vehicle charging connector comprising: a pair of power terminals each including a connecting part to be connected to the connector connection unit and a connector connection part into which a conductor of the electric vehicle charging cable is inserted to be connected to the connector connection part; and a heat sink configured to absorb heat generated in the conductor connection part of the power terminal, the heat sink including therein a return channel to which a cooling fluid is supplied from a cooling unit included in a conductor of a power unit of the electric vehicle charging cable and which is connected to a collection unit included in the electric vehicle charging cable to collect the cooling fluid.

And the heat sink may comprise a heat absorbing part configured to absorb heat generated in the conductor connection part of the power terminal by heat conduction.

And the heat absorbing part may have a shape corresponding to a shape of an outer circumferential surface of the conductor connection part of the power terminal.

And the electric vehicle charging connector may further comprise a thermal pad between the outer circumferential surface of the conductor connection part and the heat absorbing part of the heat sink, the thermal pad being formed of a flexible material.

And the electric vehicle charging conductor may further comprise a pair of connection pipes configured to connect a cooling channel in the cooling unit of the electric vehicle charging cable and the return channel in the heat sink, wherein the pair of connection pipes are connected to opposite upper ends of the heat sink, the collection unit is connected to a lower end of the heat sink, and the heat sink is provided in a V shape to separate positions of the grounding unit and the pair of power units from one another.

In an electric vehicle charging connector and an electric vehicle charging assembly including the same, the electric vehicle charging connector may include a heat sink to effectively cool the electric vehicle charging connector during charging of an electric vehicle, heat generated at an interface between an electric vehicle cable and a conductor of a connector connection unit may be quickly absorbed by the heat sink, and a cooling fluid may cool the heat sink while circulating in the heat sink to cool an electric vehicle charging cable and thereafter be collected in an electric vehicle charger after the cooling of the heat sink, thereby cooling the electric vehicle charging cable and the electric vehicle charging connector together.

In addition, in the electric vehicle charging connector and the electric vehicle charging assembly including the same according to the present disclosure, the entire electric vehicle charging assembly can be efficiently cooled using the cooling fluid to prevent damage to a product, prevent a safety accident from occurring due to overheating of the connector connection unit or the electric vehicle charging cable, and improve product reliability.

DETAILED DESCRIPTION

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure will be thorough and complete, and fully convey the scope of the disclosure to those of ordinary skill in the art. Throughout the specification, the same reference numbers represent the same elements.

In the following description, an electric vehicle ev is a vehicle that drives an electric motor using electric energy charged in a battery included in the vehicle and uses a driving force of the electric motor as power of the vehicle, and more particularly, a plug-in electric vehicle (PEV).

However, the electric vehicle ev should not be understood as being limited to a general car running on the road and should be understood as a concept including a cart, a working vehicle, a motorcycle, etc., as well as the general car running on the road.

Figure 1:
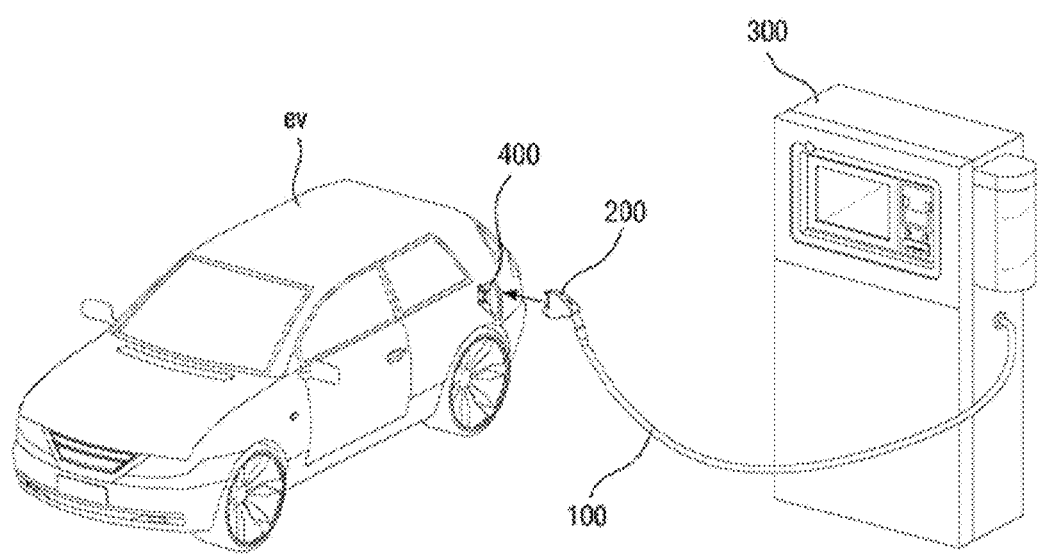
FIG. 1 illustrates an electric vehicle charging system that includes an electric vehicle charger, an electric vehicle charging assembly, and an electric vehicle ev.

FIG. 1 illustrates an electric vehicle charging system that includes an electric vehicle charger, an electric vehicle charging assembly, and an electric vehicle ev.

An electric vehicle charger 300 is connected to an electric vehicle charging connector 200 through an electric vehicle charging cable 100 to supply power to the electric vehicle ev. The electric vehicle charging connector 200 is provided at an end of the electric vehicle charging cable 100.

The electric vehicle charging connector 200 may be mounted into a connector connection unit 400 of the electric vehicle ev to supply power. Charging of the electric vehicle ev may be completed in a short time by using a quick electric vehicle charger.

During quick charging of an electric vehicle, a conductor of the electric vehicle charging cable 100 and a power terminal of the electric vehicle charging connector 200 to which the connector is connected may be overheated due to a high current capacity.

In a method of the related art, a cooling fluid is injected into the electric vehicle charging cable 100 to cool heat generated in the electric vehicle charging cable 100 but the power terminal of the electric vehicle charging connector 200 cannot be sufficiently cooled.

Accordingly, an electric vehicle charging assembly 1000 of the present disclosure includes a heat sink in the connector to efficiently cool the electric vehicle charging connector 200, and a cooling unit at a center of each of a pair of power units of the electric vehicle charging cable 100 to cool both the power terminal of the electric vehicle charging connector 200 and the connector of the electric vehicle charging cable 100.

Figure 2:
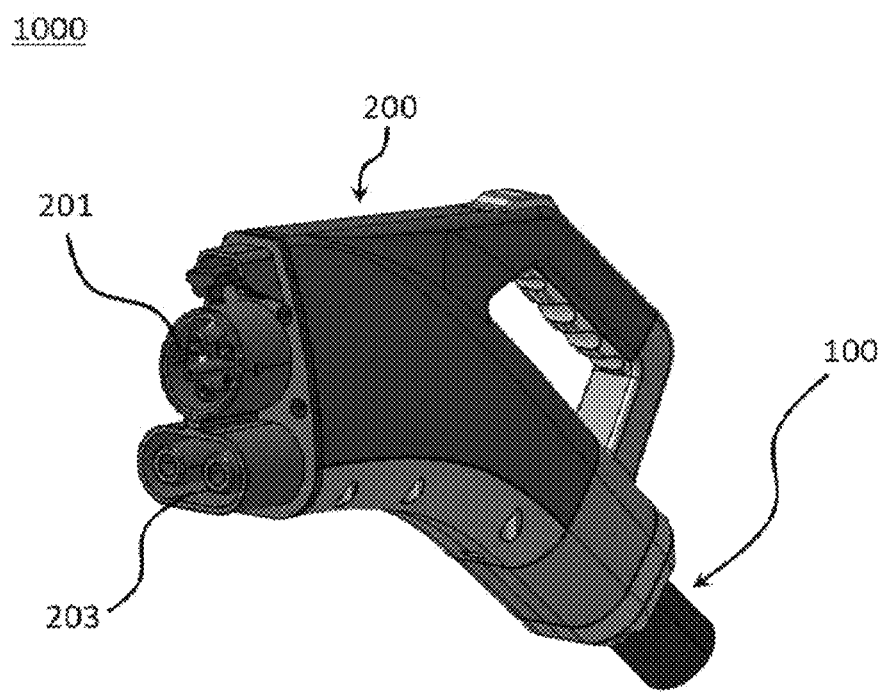
FIG. 2 is a perspective view of an electric vehicle charging assembly that includes an electric vehicle charging cable included in an electric vehicle and an electric vehicle charging connector configured to be connected to the electric vehicle charging cable.

FIG. 2 is a perspective view of an electric vehicle charging assembly that includes an electric vehicle charging cable included in an electric vehicle and an electric vehicle charging connector configured to be connected to the electric vehicle charging cable.

The electric vehicle charging connector 200 is applicable to the 'CHAdeMO' method used in Japan or the Renault '3-phase AC' method, as well as the combo ('TYPE1') method used in the USA and Europe and determined as a unification standard.

As illustrated in FIG. 2, the electric vehicle charging connector 200 is mounted into an end of the electric vehicle charging cable 100 of the present disclosure and configured to be detachably mounted in the connector connection unit 400 of the electric vehicle ev.

A connector employing the 'combo (TYPE1)' method may be a combination of AC or DC connectors each having a slow charger 201 and a quick charger 203 to support both slow charging and quick charging.

A product may be damaged or a user may get burned, i.e., a safety accident may occur, due to heat generated in the conductor of the electric vehicle charging cable 100 due to a high current during quick charging, and particularly, overheating of a power terminal electrically connected to the conductor.

Accordingly, in the present disclosure, a structure for efficiently cooling both an electric vehicle charging cable and an electric vehicle charging connector using a cooling fluid is employed.

Figure 3:
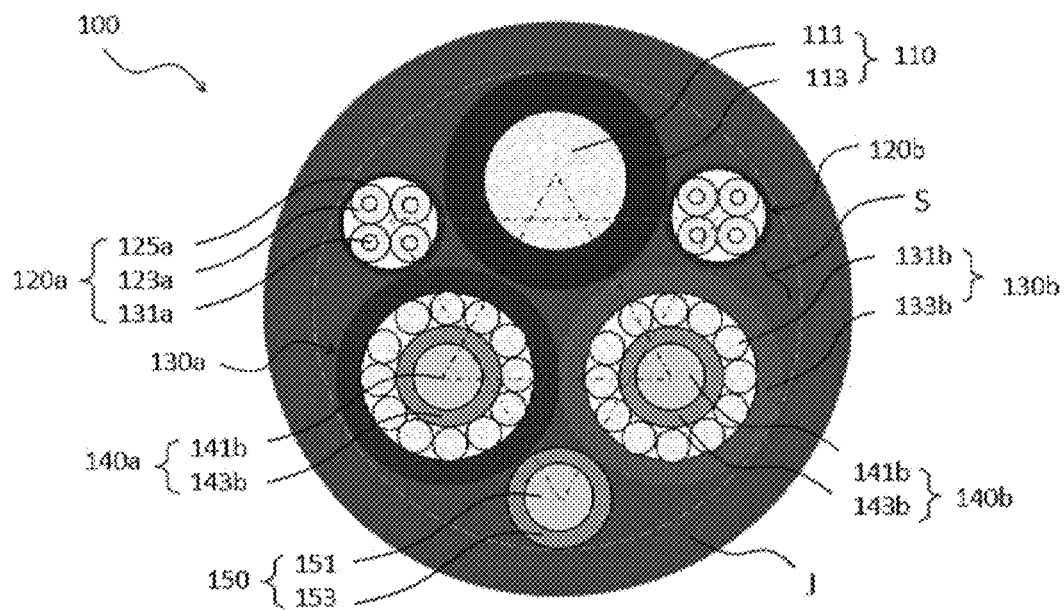
FIG. 3 is a cross-sectional view of an electric vehicle charging cable of an electric vehicle charging assembly according to the present disclosure.

FIG. 3 is a cross-sectional view of an electric vehicle charging cable of an electric vehicle charging assembly according to the present disclosure.

A structure of an electric vehicle charging cable 100 will be described in detail below.

As shown in FIG. 3, the electric vehicle charging cable 100 includes: one grounding unit 110; at least one communication unit 120; a pair of power units 130*a* and 130*b* including conductors 131*a* and 131*b* and insulating layers 133*a* and 133*b* covering the conductors 131*a* and 131*b*; cooling units 140*a* and 140*b* configured to cool the conductors 131*a* and 131*b*, included in the conductors 131*a* and 131*b* of the power units 130*a* and 130*b*, and including cooling tubes 143*a* and 143*b* and cooling channels 141*a* and 141*b*, which are provided in the cooling tubes 143*a* and 143*b* and in which a cooling fluid flows; and a collection unit 150 including a collection tube 153 in which a collection channel 151 is provided to collect the cooling fluid supplied through the cooling units 140*a* and 140*b*.

The power units 130*a* and 130*b* of the electric vehicle charging cable 100, which supply power, are likely to be overheated during charging of an electric vehicle, and in the electric vehicle charging cable 100 of the present disclosure, the pair of cooling units 140*a* and 140*b* are respectively included in the pair of power units 130*a* and 130*b* and the cooling fluid is introduced into the cooling channels 141*a* and 141*b* of the cooling units 140*a* and 140*b* to cool the power terminals 130*a* and 130*b* to a certain degree.

A method of cooling the conductors 131*a* and 131*b* in the pair of power units 130*a* and 130*b* by using the cooling fluid supplied from the electric vehicle charger 300 of FIG. 1 through the cooling tubes 143*a* and 143*b*, changing a channel to cause the cooling fluid to flow to the collection unit 150, collecting and cooling the cooling fluid by the electric vehicle charger 300, and supplying the cooling unit again may be employed by the cooling units 140*a* and 140*b* included in the pair of power units 130*a* and 130*b*.

Thus, a cooling device for re-cooling the cooling fluid and a pumping device for circulating the cooling fluid may be provided inside or outside the electric vehicle charger 300. Only a conductor with an insulating layer may be withdrawn to a charger power supplier (not shown), and the cooling fluid flowing through the cooling tubes 143*a* and 143*b* may be re-cooled and pumped by the cooling device and the pumping device to form a circulation channel.

As shown in FIG. 3, the components of the electric vehicle charging cable 100 are only examples, and a total diameter of the cable may be reduced by adjusting the positions of the components such that a triangle connecting the centers of the pair of power units 130*a* and 130*b* and the grounding unit 110 and a triangle connecting the centers of the pair of communication units 120*a* and 120*b* and the collection unit 150 are regular triangles, but the present disclosure is not limited to the above structure.

A connection structure of an electric vehicle charging connector and an electric vehicle charging cable of the electric vehicle charging assembly 1000 will be described in detail below.

Figure 4:
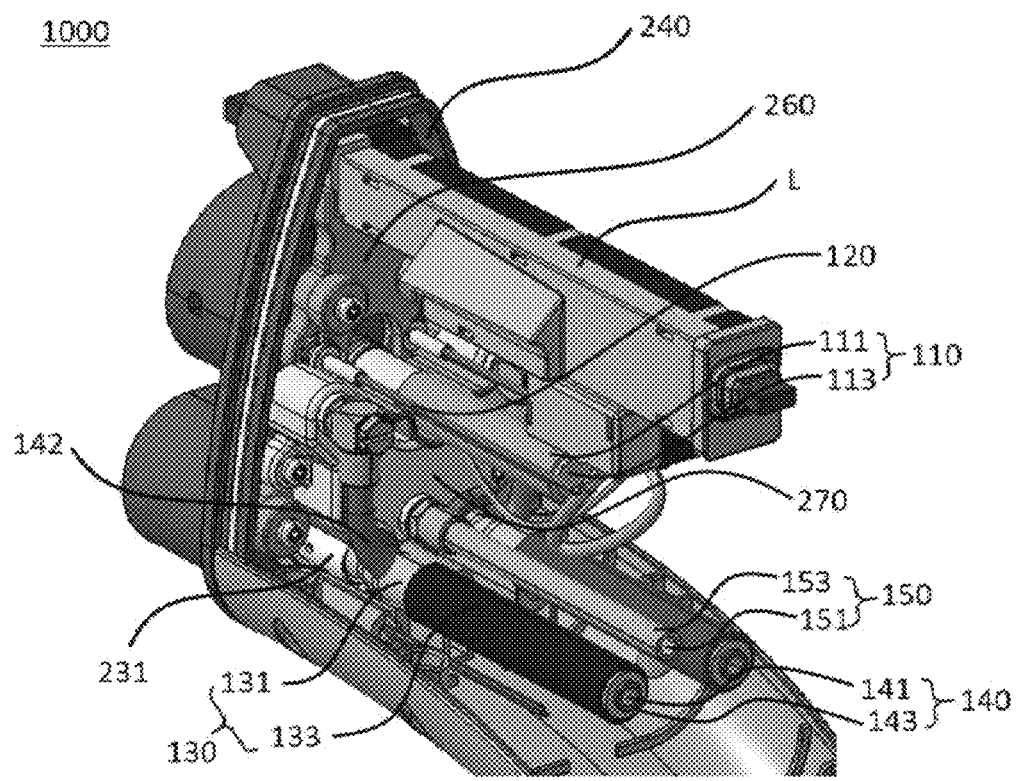
FIG. 4 is a rear perspective view of an electric vehicle charging assembly from which a housing is removed.
Figure 5:
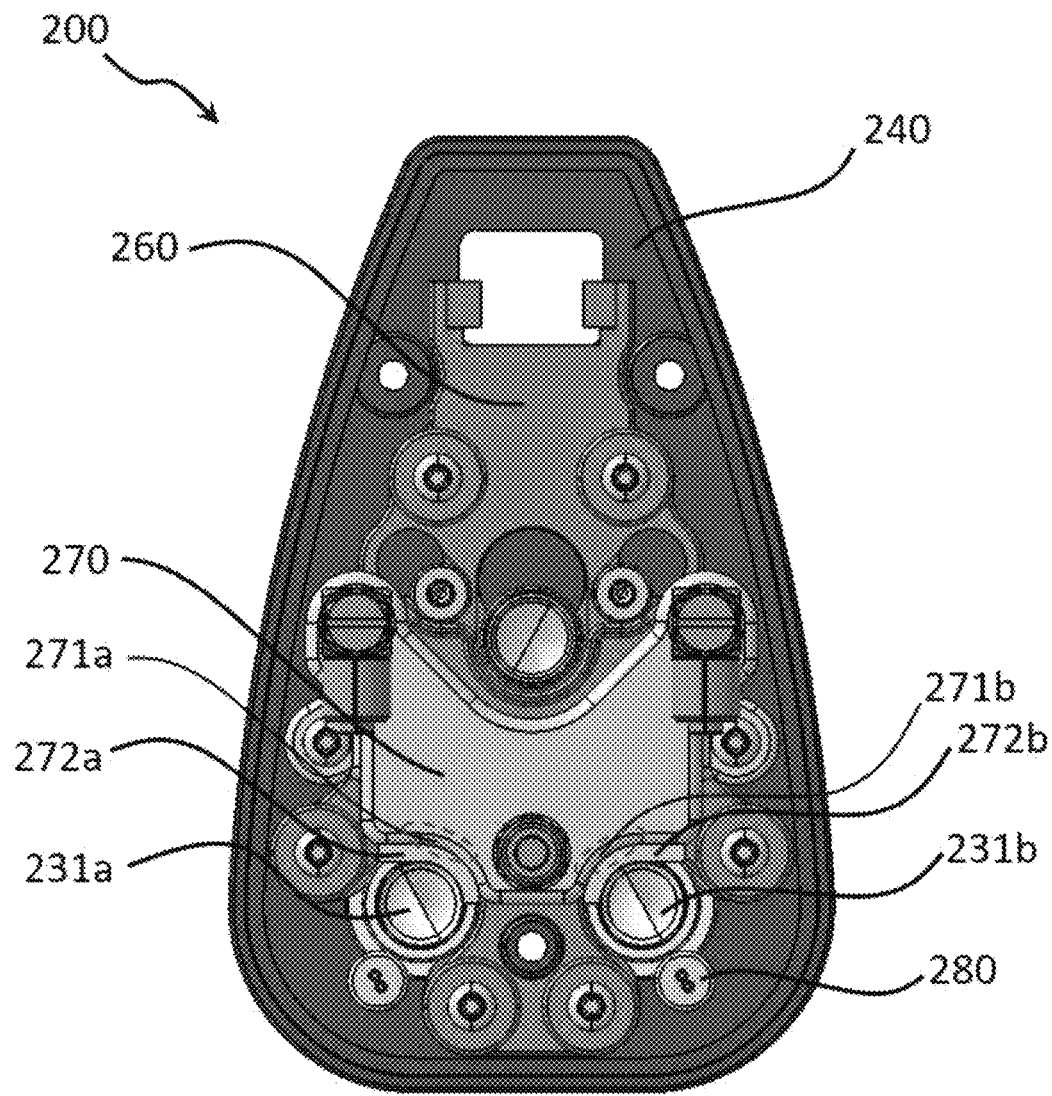
FIG. 5 is a front view of key components of a cooling structure of the electric vehicle charging assembly of FIG. 4 when viewed from the rear.

FIG. 4 is a rear perspective view of an electric vehicle charging assembly from which a housing is removed. FIG. 5 is a front view of key components of a cooling structure of the electric vehicle charging assembly of FIG. 4 when viewed from the rear.

Figure 6:
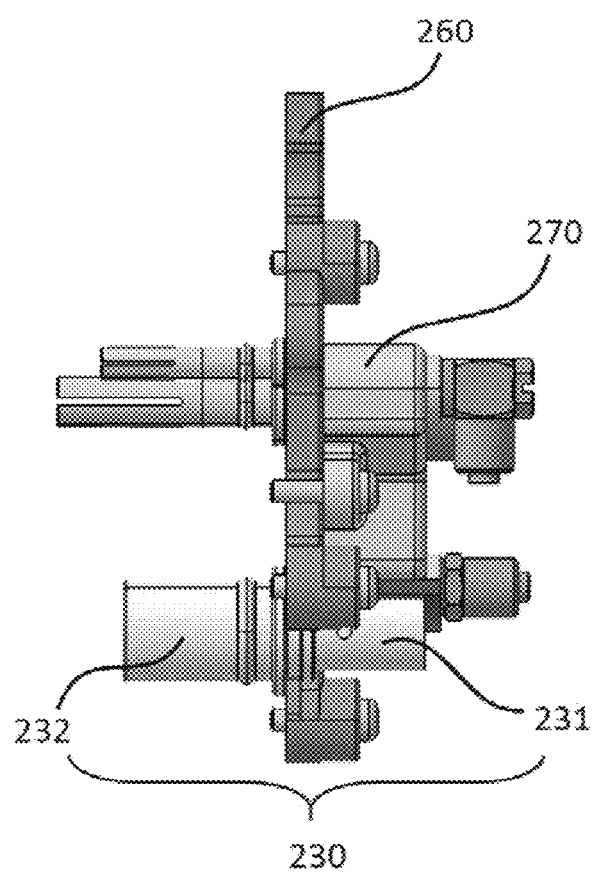
FIG. 6 is a side cross-sectional view of the electric vehicle charging assembly of FIG. 5.

FIG. 6 is a side view of the electric vehicle charging assembly of FIG. 5.

In the electric vehicle charging assembly 1000, the electric vehicle charging cable 100 may be connected to the rear of the electric vehicle charging connector 200 and the connector connection unit 400 (see FIG. 1) may be detachably connected to a front charging part of the electric vehicle charging connector 200 to supply power to the electric vehicle ev and transmit or receive a control signal.

The electric vehicle charging connector 200 of the present disclosure may include a locking unit L for locking when connected to a connector connection unit of an electric vehicle, and the locking unit L may include a locking means for enabling selective locking, a physical switch for selectively canceling a locking state, a control switch for controlling a charging operation, or the like.

Here, the electric vehicle charging connector 200 may include a pair of power terminals 230 including a connecting part 232 to be connected to the connector connection unit 400 of the electric vehicle ev, and a conductor connection part 231 into which the conductor 131 of the electric vehicle charging cable 100 is inserted to be connected thereto; and a heat sink 270 configured to absorb heat generated in the conductor connection part 231 of the power terminal 230, and including a return channel therein for collecting a cooling fluid flowing through the cooling unit 140 and supplying the cooling fluid to the collection unit 150.

As shown in FIGS. 4 to 6, an interlock system including an interlock terminal and the communication unit 120 may be mounted in the electric vehicle charging connector 200 to prevent sparks, etc. from occurring when a connector is mounted or separated.

A connector housing 240 may be formed of an insulating resin material such as plastic, and may protect the inner components of the electric vehicle charging connector 200 and form an exterior of the electric vehicle charging connector 200. Here, it is preferable that the function, shape and connection specifications of the connector housing 240 are set to satisfy certain design specifications of the connector connection unit 400, e.g., IEC 62196-3 standard.

A mounting plate 260 may be provided in the rear of the connecting housing 240 and formed of a plastic material to be used as a place in which terminals for connection to the grounding unit 110 and the communication unit 120 of the electric vehicle charging cable 100 and the inner components such as the heat sink 270 are mounted.

The power terminal 230 (see FIG. 6) of the electric vehicle charging connector may include a connecting part 232 to be connected to the connector connection unit 400, and a pair of conductor connection parts 231a and 231b which are located opposite to the connecting part 232 and into which the pair of power units 130a and 130b of the electric vehicle charging cable 100 are inserted to be electrically connected thereto.

Here, the conductors 131a and 131b electrically connected to the conductor connection parts 231a and 231b may be formed of a metal having high electric conductivity, e.g., tin, copper, aluminum, or an alloy thereof, and preferably, annealed copper wire, and may have a self-twist and helically wound structure in which several twisted conductors formed by twisting multiple strands in a certain twist pitch are wound in a certain pitch.

A tape for covering the multiple strands to maintain the twisted or wound state is not necessary owing to the self-twist and helically wound structure, thereby preventing an increase of external diameters of the electric vehicle charging cable 100 or the conductor connection parts 231a and 231b or deterioration of the flexibility thereof.

The conductor connection parts 231a and 231b are parts to which the conductors 131a and 131b are connected in a longitudinal direction and thus may be formed of a metal having high electric conductivity, e.g., copper, aluminum or an alloy thereof.

In order to increase an electric contact area with the conductors 131a and 131b, the conductor connection parts 231a and 231b may be formed in a cylindrical pipe structure covering the outer circumferential surfaces of the conductors 131a and 131b when the conductors 131a and 131b are formed in a bar shape.

An interface between the conductor connection parts 231a and 231b of the electric vehicle charging connector 200 and the conductors 131a and 131b of the electric vehicle charging cable 100 may be most overheated during charging of an electric vehicle.

Accordingly, the electric vehicle charging connector 200 of the present disclosure employs a cooling structure in which heat generated in the conductor connection part 231 of the power terminal 230 is absorbed by a heat sink to be described below and the heat sink is cooled using a cooling fluid flowing through the cooling unit 140 of the electric vehicle charging cable, so that the electric vehicle charging cable 100 and the electric vehicle charging connector 200 may be cooled together using the cooling fluid supplied from an electric vehicle charger.

In general, a heat sink is configured to absorb heat generated in an electronic product by heat conduction and quickly cool the heat using natural cooling, blowing cooling or cooling liquid while a heat dissipation area is increased.

The heat sink 270 employed in the electric vehicle charging connector 200 of the present disclosure absorbs heat generated in the conductor connection part 231 of the power terminal 230 during charging of an electric vehicle and cools the heat sink 270 by water cooling (liquid cooling) by circulating a cooling fluid (cooling liquid) used for cooling in the electric vehicle charging cable 100.

The cooling fluid may be an aqueous solution having high thermal conductivity, but the present disclosure are not limited thereto and an insulating liquid may be used as needed.

Here, a heat absorbing part 271 may be provided at the bottom of the heat sink 270 to absorb heat generated in the conductor connection part 231 by heat conduction. The absorbing of the heat by heat conduction may be understood to mean a method of conducting heat to a relatively low-temperature material using a temperature difference between materials in different solid states.

Therefore, heat generated in the conductor 131 and the conductor connection part 231 may be transmitted to the heat sink 270 having a relatively low temperature through the heat absorbing part 271.

The heat absorbing part 271 may be formed in a shape corresponding to that of an outer circumferential surface of the conductor connection part 231 of the power terminal 230, thereby increasing a contact area between the heat absorbing part 271 and the conductor connection part 231.

However, even when the heat absorbing part 231 at the bottom of the heat sink 270 is formed to correspond to the outer circumferential surface of the conductor connection part 231, there may be a clearance, e.g., a gap, between the heat absorbing part 271 and the outer circumferential surface of the conductor connection part 231. Because the amount of heat absorbed by heat conduction increases in proportion to a contact cross-sectional area between the conductor connection part 231 and the heat absorbing part 271, the contact area should be increased to increase the amount of heat absorbed.

Thus, a thermal pad 272 may be interposed between the heat absorbing part 271 of the heat sink 270 and the conductor connection part 231.

The thermal pad 272 may be a flexible sheet member, both sides of which are adhesive surfaces and may be formed of an acrylic or silicon-based thermally conductive material to directly transmit heat emitted from the conductor connection part 231 to the heat sink 270, thereby improving heat conduction performance of the heat sink 270.

The thermal pad may have high thermal conductivity and be formed of an insulating material if necessary.

As shown in FIG. 5, when the pair of power terminals 230a and 230b have a cylindrical pipe structure, the heat absorbing parts 271a and 271b on both lower sides of the heat sink 270 may have curved surfaces corresponding to portions of round outer circumferential surfaces of the power terminals 230a and 230b.

In addition, at least one temperature sensor 280 may be provided near the pair of conductor connection parts 231a and 231b to control the amount of power to be supplied, a temperature of the cooling fluid to be supplied, or a flow rate according to a temperature of the conductor connection parts 231a and 231b.

Figure 7:
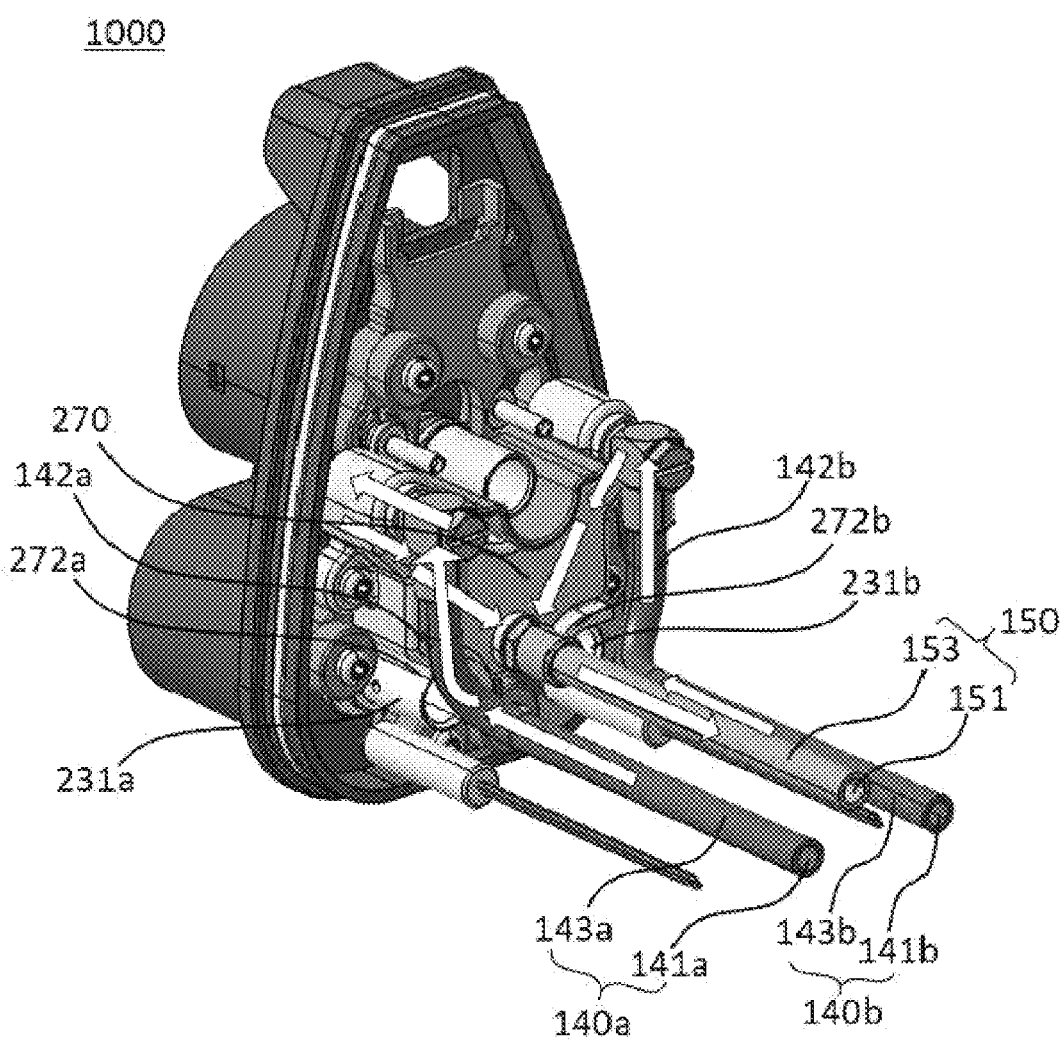
FIGS. 7 and 8 are a perspective view of an electric vehicle charging assembly according to the present disclosure, in which a channel of a cooling fluid is shown, and a front view of the electric vehicle charging assembly when viewed from the rear.
Figure 8:
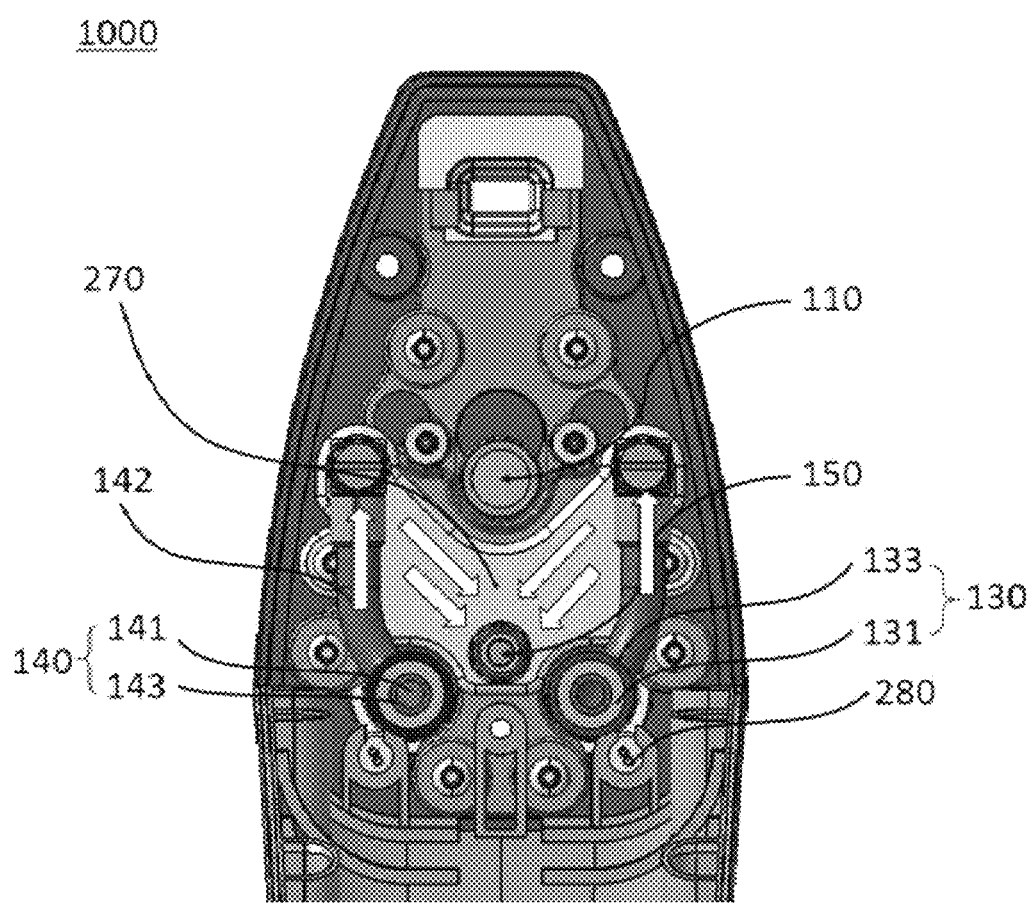

FIG. 7 is a side cross-sectional view of the electric vehicle charging assembly of FIG. 5. FIGS. 8 and 9 are a perspective view of an electric vehicle charging assembly according to the present disclosure in which a channel of a cooling fluid is shown, and a front view of the electric vehicle charging assembly when viewed from the rear.

As described above, heat of the conductor connection part 231 may be sequentially conducted to the thermal pad 237 formed of a flexible material, the heat absorbing part 271, and the heat sink 270, thereby cooling the conductor connection part 231.

A return channel may be provided in the heat sink 270 so that the cooling fluid supplied to the electric vehicle charging connector through the cooling unit 140 of the electric vehicle charging cable may be introduced into the heat sink 270 to cool the heat sink 270 while circulating in the heat sink 280, and the return channel in the heat sink 270 and the collection unit 150 of the electric vehicle charging cable 100 may be connected to collect the cooling fluid, which is used to cool the return channel, in the electric vehicle charger through the collection unit 150, thereby continuously cooling the heat sink 270.

Due to the above structure, the heat sink 270 may be cooled to continuously maintain performance of absorbing heat from the conductor connection part 231 and effectively cool the conductor 131 and the conductor connection part 231.

A flow of a channel of the cooling fluid in the electric vehicle charging assembly 1000 will be described in detail below.

The cooling fluid supplied through the cooling tube 143 of the pair of cooling units 140 may cool the conductor 131 and the conductor connection part 231 during circulation and be collected in the electric vehicle charger 300 through the collection unit 150. Here, the collection unit 150 may be connected to the return channel of the heat sink 270, and only one collection unit 150 may be provided to collect the cooling fluid.

Here, the return channel is a channel formed in the heat sink 270 to cool the heat sink 270 during circulation according to pressure applied by a pumping device of an electric vehicle charger.

Through repetitive experiments, it was confirmed that the heat sink absorbing heat from the conductor connection part can be sufficiently cooled by the cooling fluid supplied to the heat sink even after the cooling fluid was used to cool the power unit of the electric vehicle charging cable.

Connection pipes 142a and 142b may be provided in the connector to connect the cooling channels 141a and 141b of the electric vehicle charging cable and the return channel of the heat sink.

As shown in FIG. 4 or 7, the connection pipes 142a and 142b may be connected to points on the cooling channels 141a and 141b of the electric vehicle charging cable to be connected to an upper side of the heat sink.

The connection pipe may be formed by drawing the cooling tubes of the cooling units between conductors.

Accordingly, as shown in FIG. 7, after the cooling fluid sufficiently cools the conductors in a longitudinal direction of the cooling channels 141a and 141b of the pair of cooling units 140a and 140b, a direction of the flow of the channel may be changed to an upward direction along the connection pipes 142a and 124b connected to the points on the cooling channels 141a and 141b, and the cooling fluid may flow along the return channel in the heat sink 270, thus cooling the heat sink 270, and thereafter be collected by the collection unit 150.

FIG. 8 is a cross-sectional view of the electric vehicle charging assembly 1000 according to the present disclosure in which the flow of a channel of a cooling fluid is shown, when viewed from a rear inner side.

As shown in FIG. 8, the heat sink 270 may be formed in a V shape so that in the electric vehicle charging connector 200, the positions of the grounding unit 110 and the pair of power units 130a and 130b may be appropriately separated from one another. The heat sink 270 may be designed to have a V shape when the grounding unit 110 is accommodated in the center of the heat sink 270.

As described above, the cooling fluid introduced through the pair of cooling tubes 143 to cool the conductor 131 may sequentially flow through the cooling channel 141 and the connection pipe 142 and be then supplied to the heat sink 270, thus cooling the heat sink 270 heated by heat conduction, and thereafter be collected along a return channel having a V shape through the collection unit 150 connected to the bottom of the heat sink 270.

In addition, the temperature sensor 280 near each of the bottoms of the pair of power units 130 may detect a temperature of the conductor connection part to control or adjust the intensity of power to be supplied, a temperature or flow rate of a cooling fluid to be supplied through the cooling unit, or the like, thereby achieving an optimal cooling effect according to cooling load.

While the present disclosure has been described above with respect to exemplary embodiments thereof, it would be understood by those of ordinary skill in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. An electric vehicle charging assembly comprising:
an electric vehicle charging cable comprising: a grounding unit; at least one communication unit; a pair of power units each including a conductor and an insulating layer covering the conductor; a cooling unit configured to cool the conductor and included in the conductor of each of the power units, the cooling unit including a cooling tube and a cooling channel which is provided in the cooling tube and in which a cooling fluid flows; and a collection unit including a collection tube in which a return channel is provided to collect the cooling fluid supplied through the cooling unit; and
an electric vehicle charging connector comprising: a pair of power terminals each including a connecting part to be connected to a connector connection unit included in an electric vehicle and a conductor connection part into which the conductor of the electric vehicle charging cable is inserted to be connected to the connector connection unit; and a heat sink configured to absorb heat generated in the conductor connection part of each of the power terminals, and including therein a return channel for collecting the cooling fluid flowing through the cooling unit and supplying the cooling fluid to the collection unit.

2. The electric vehicle charging assembly of claim 1, wherein the heat sink comprises a heat absorbing part configured to absorb heat in the conductor connection part of each of the power terminals by a heat conduction method.

3. The electric vehicle charging assembly of claim 2, wherein the heat absorbing part has a shape corresponding to a shape of an outer circumferential surface of the conductor connection part of each of the power terminals.

4. The electric vehicle charging assembly of claim 3, further comprising a thermal pad between the outer circumferential surface of the conductor connection part and the heat absorbing part of the heat sink, the thermal pad being formed of a flexible material.

5. The electric vehicle charging assembly of claim 1, wherein one collection unit is provided to collect the cooling fluid supplied through a pair of cooling units.

6. The electric vehicle charging assembly of claim 1, wherein the electric vehicle charging connector further comprises a pair of connection pipes configured to connect the cooling channel in the cooling unit of the electric vehicle charging cable and the return channel of the heat sink.

7. The electric vehicle charging assembly of claim 6, wherein the collection unit is connected to the heat sink to be connected to the return channel of the heat sink.

8. The electric vehicle charging assembly of claim 1, wherein the heat sink is provided in a V shape to separate positions of the grounding unit and the pair of power units from each other.

9. The electric vehicle charging assembly of claim 7, wherein the pair of connection pipes are connected to opposite upper ends of the heat sink, and the collection unit is connected to a lower end of the heat sink.

10. The electric vehicle charging assembly of claim 1, wherein the conductor of the electric vehicle charging cable connected to the power terminal has a self-twist and helically wound structure in which multiple self-twisted conductors formed by twisting multiple strands in a twist pitch are helically wound in a certain winding pitch.

11. The electric vehicle charging assembly of claim 1, further comprising a temperature sensor configured to measure temperature near the pair of power terminals.

12. The electric vehicle charging assembly of claim 1, wherein the electric vehicle charging connector further comprises an interlock terminal.

13. An electric vehicle charging connector, which supplies power to charge an electric vehicle when detachably mounted into a connector connection unit of the electric vehicle while being mounted into an electric vehicle charging cable, the electric vehicle charging connector comprising:

a pair of power terminals each including a connecting part to be connected to the connector connection unit and a connector connection part into which a conductor of the electric vehicle charging cable is inserted to be connected to the connector connection part; and a heat sink configured to absorb heat generated in the conductor connection part of the power terminal, the heat sink including therein a return channel to which a cooling fluid is supplied from a cooling unit included in a conductor of a power unit of the electric vehicle charging cable and which is connected to a collection unit included in the electric vehicle charging cable to collect the cooling fluid.

14. The electric vehicle charging connector of claim 13, wherein the heat sink comprises a heat absorbing part configured to absorb heat generated in the conductor connection part of the power terminal by heat conduction.

15. The electric vehicle charging connector of claim 14, wherein the heat absorbing part has a shape corresponding to a shape of an outer circumferential surface of the conductor connection part of the power terminal.

16. The electric vehicle charging connector of claim 15, further comprising a thermal pad between the outer circumferential surface of the conductor connection part and the heat absorbing part of the heat sink, the thermal pad being formed of a flexible material.

17. The electric vehicle charging conductor of claim 13, further comprising a pair of connection pipes configured to connect a cooling channel in the cooling unit of the electric vehicle charging cable and the return channel in the heat sink, wherein the pair of connection pipes are connected to opposite upper ends of the heat sink, the collection unit is connected to a lower end of the heat sink, and the heat sink is provided in a V shape to separate positions of the grounding unit and the pair of power units from one another.

* * * * *